Dec. 17, 1946.   L. MALTER   2,412,822
PHOTOELECTRIC DEVICE
Filed March 26, 1942   2 Sheets-Sheet 1

INVENTOR
LOUIS MALTER
BY
ATTORNEY

Patented Dec. 17, 1946

2,412,822

UNITED STATES PATENT OFFICE 2,412,822

PHOTOELECTRIC DEVICE

Louis Malter, Newark, N. J., assignor to Radio Corporation of America, a corporation of Delaware Application March 26, 1942, Serial No. 436,241

8 Claims. (Cl. 250—41.5)

This invention relates to photoelectric devices and, more particularly, to apparatus for and a method of detecting motion of objects utilizing photoelectric mosaics.

It is often desirable to have a detecting system which will give an indication whenever an object moves within a predetermined space because such detectors are useful for burglar alarm systems, trespass notice systems, detecting aircraft, anl the like. Where the volume of space within which it is required to detect the movement of an object is large the detecting system must be able to differentiate a very small change in the parameter which controls the system and the problem becomes especially difficult where it is desired to detect movement of an object at considerable distance from the detection point, and even more so, if there is low contrast between the object and the background. This arises from the fact that the usual detecting system utilizes a photoelectric device. A photoelectric device is an integrating one and if the object is small over the extended area, then the change in photoelectric current introduced by the object coming within the field is very small compared with the total photoelectric current resulting from the illumination of the entire field. The ability to differentiate between the two conditions is low because the required amplification of the photoelectric current is generally so large as to bring up the noise level to the point where it can be of the same magnitude as the change in current produced by the introduction of an object within the field, especially when the object is at a considerable distance from the photoelectric device. Moreover, due to the integrating characteristics of the photoelectric cell, once the object is within the field, the photoelectric cell is unable, under usual conditions, to reveal its presence, whether it is moving or static, since the change in photoelectric current remains at a fixed value.

My invention overcomes the shortcomings of previously known detection systems by making it possible to readily determine the entry of an object within a predetermined volume or space, and, moreover, to determine, once the object is within the prescribed space, whether or not the object is moving or is stationary.

In accordance with my invention I provide a photoelectric mosaic in which there are two groups of alternating elements, the elements of each group being connected together, and the two groups are connected to a bridge-like arrangement. The output of the bridge is such as to suppress the steady component so that only fluctuations in an emission current from the elements of the mosaic are capable of being passed. Fluctuation current may then be amplified and used to actuate a suitable detecting device or alarm. It will be readily appreciated that under these conditions the entry of an object within a field will immediately give an indication of its entry and, moreover, if it continues to move, a continuous indication will be given. Once, however, the object is introduced within the field and it becomes stationary thereafter, no further indication will be given so that it enables the observer to tell whether the object is moving or stationary within the prescribed space.

A further advantage which flows from this method of detection is that since the steady component is suppressed, the problem of differentiation between the photoelectric currents set up by illumination of the space and the change in photoelectric current brought about by the introduction of the object within the space is rendered simpler. In other words, where the D. C. component is suppressed, it is only necessary to differentiate between zero current and the fluctuation current, so that the problem becomes that of detecting a relatively large percentage change in current, whereas, if the D. C. component were not suppressed, the difference in currents would be only a very small percentage.

Accordingly, one of the main objects of my invention is to provide new and improved method and apparatus for detecting the presence of objects in a predetermined space.

Another object of my invention is to provide a new photoelectric device for use in detection systems.

Another object of my invention is to provide a new circuit and apparatus for detecting objects within a prescribed space and whether or not the objects are moving or stationary.

Further objects of my invention will become readily discernible upon reading the following detailed description taken together with the drawings.

In the drawings:

Figure 4 shows a modification of the mosaic shown in Figure 1; while

Figure 1:
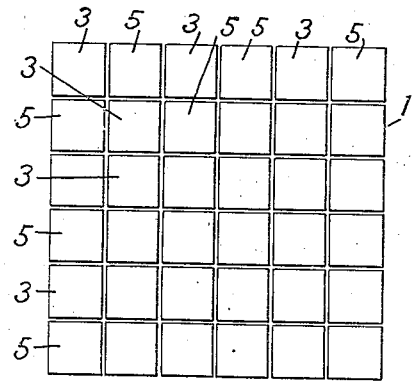
Figure 1 shows schematically a mosaic made in accordance with my invention.

In Figure 1 there is shown a photoelectric mosaic 1 comprising a first group of elements 3, 3, ..., and a second group of elements 5, 5, .... It will be noted that the elements 3 alternate with the elements 5 so that each element 3 is bounded on all sides by elements 5, while each element 5 is bounded on all sides by elements 3, and resulting, as it were, in a checkerboard arrangement of the elements 3 and 5. All of the elements 3 are connected together, while all of the elements 5 are connected together.

Figure 2:
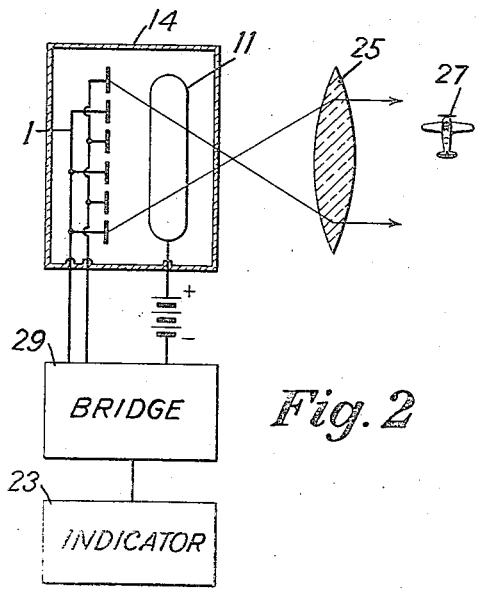
Figure 2 shows in schematic form the elements of a detecting system made in accordance with my invention and embodying the method thereof.

As shown in Figure 2, the mosaic is mounted within a photoelectric device 14 and includes an anode 11 in the form of a ring together with the mosaic 1. The conductors connected to the two groups of elements are connected to a bridge 29, the output of which is connected to a suitable indicator 23. A suitable optical system 25 produces an image of the predetermined space on the mosaic 1. Light falling on the mosaic elements causes the emission of photoelectrons which are picked up by the anode 11 causing current to flow through the bridge 29. By initially balancing the bridge no current will be present in the output of the bridge to actuate the indicator 23. If now an object is introduced within the prescribed space, such as an aeroplane 27, the illumination of the mosaic elements will be changed and consequently the balance of the bridge will be upset, producing an output voltage which may then actuate the indicator 23. If means are provided for suppressing the steady-state output of the bridge, then if the aeroplane is moving, its traversal will produce in the image plan a change of illumination from mosaic to mosaic, setting up a fluctuating current thereby which will be transmitted by the bridge and consequently give an indication at the indicating device 23. On the other hand, if the object stops moving, then there will no longer be any fluctuating current and so the indicator will no longer be affected by output from the bridge 29.

Figure 3:
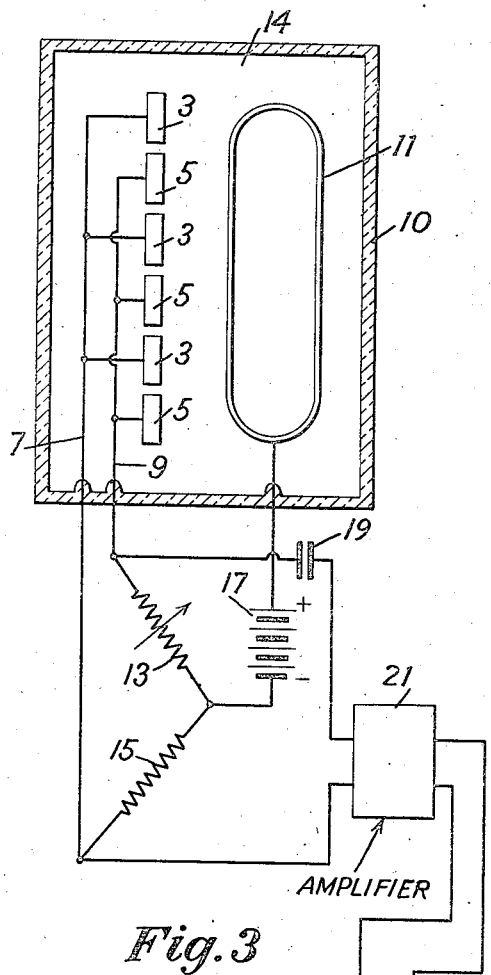
Figure 3 shows in somewhat more detail a photoelectric device and bridge circuit together with other elements embodied in my invention.

In Figure 3, I have shown in somewhat more detail the circuit arrangement which provides the bridge-like connection and which also provides the means for suppressing the direct current of the steady-state current from the output of the bridge. In Figure 3 the photoelectric device 14, comprising the mosaic elements 3 and 5, includes a ring-like anode 11 for picking up photoelectrons released from the mosaic elements. These are mounted within an envelope 10 and supported therein. All of the elements 3 are connected to the conductor 7, while the elements 5 are connected to the conductor 9. A pair of serially connected resistors 13 and 15 have their junction point connected to the negative side of a source of voltage 17, while the positive pole of the source 17 is connected to the anode 11. The conductor 7 is connected to one resistor 15, while the conductor 9 is connected to the resistor 13, which is shown as a variable resistance for purposes of initially balancing the bridge. It will be readily appreciated that if uniform illumination is provided to all the mosaic elements, which have been photosensitized by methods well known in the art, that assuming a like number of elements in each group, there will be zero difference of potential between the conjugate points of the bridge, i. e., between the conductors 7 and 9. If now, however, the illumination on the elements is rendered non-uniform, as would result from the introduction of an object within the predetermined space, a difference of potential will result, since the total photoelectric current flowing from the group of elements 3 and the group of elements 5 are no longer equal. There will thus be set up across the conjugate points of the bridge a potential, and so long as this illumination remains unchanged, the potential will also remain unchanged. However, if the object moves, then in the image plane on the mosaic elements, the object will move from one of the elements 3 to an element 5 and if it continues to move, will eventually move off the element 5 to another of the elements 3. Each time the image of the object moves from an element of one group to an element of a second group, the polarity of the potential between the conjugate points of the bridge will change, i. e., alternating current will be set up. By feeding the potential set up between the conjugate points of the bridge connection to an amplifier 21 through a condenser 19 only this alternating current will be amplified, and the amplified current may then be used to actuate an indicating device 33, which may, for example, comprise either a meter or a signal alarm. The reason for feeding the output of the bridge through the condenser 19 is to insure that the indicating device is not operated by relatively slow changes of illumination of the object field which might result, for example, from the changes in illumination brought about by the time of the day, position of the sun, clouds in the sky, and the like. On the other hand, the entry of an object within the field causes an abrupt change in current or voltage set up by the bridge which immediately actuates the indicating device and so informs the observer of the presence of an object within the field. Continuous operation of the indicating device indicates that the object continues to move within the field. It will thus be appreciated no special sources of illumination are necessary for illuminating the field, nor is it necessary that the object introduced within the field pass between the source of illumination and the photoelectric device 14. If the indicating device 33 is to be actuated by a unidirectional current, it will be appreciated that the device 33 may include a full-wave rectifier to convert the amplified alternating current or pulse to direct current. The mosaic 1 may be made in any of the ways known to the art, as, for example, they may merely comprise square tabs to which are welded a short stud on the back side thereof and the studs in turn welded or affixed to stiff supporting wires, which comprise the interconnecting conductors. Again, the mosaic may be provided by using small photosensitized elements having a short stud on the back thereof and mounting the elements on a sheet of mica by pushing the studs through holes within the mica. Thereafter on the back side of the mica the studs are suitably connected together so as to insure that the elements of one group are all connected together, while the elements of the second group are likewise connected together. Other forms of construction may be used as well.

Figure 4:
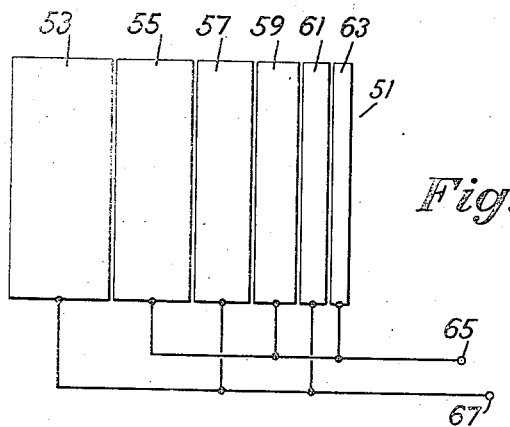

It will be appreciated that the form of the mosaic shown in Figure 1, while it reveals the presence of an object within the field and whether or not the object is moving, is incapable of determining the direction of motion of the object. Accordingly, I provide by my invention a modification of the mosaic shown in Figure 1, which modification makes possible the determination of direction of motion. I have shown schematically in Figure 4 the form of mosaic which permits directional observations and detections of objects within a predetermined space. In Figure 4 the mosaic is provided with strip-like photoelectric sensitive elements 53, 55, 63. It will be noted that as shown in the figure, the width of these mosaic elements decreases from left to right. Alternate members 53, 57, 61 are connected to the lead 67, while the other alternate members 55, 59, 63 are connected to the condenser 65. Objects moving in the direction of the decreasing widths of the photoelectric mosaic elements will generate a frequency when the terminals 65, 67 are connected to the bridge arrangement, such as shown in Figures 2 and 3, which frequency will have a relatively low value as the object enters the field and will increase in value as the image of the object progresses across the mosaic. Accordingly, if the indicating device 33 is a pair of phones, an observer will hear a tone, the pitch of which increases with time. Conversely, if the image enters at the right hand side of the mosaic shown in Figure 4 and proceeds toward the left hand side, a tone will be heard whose frequency will decrease with the progress of the object across the mosaic. Consequently, the observer can immediately determine whether or not the object is moving to the left or the right across the field by noting whether the indicating signal increases in frequency or decreases in frequency.

It will be readily appreciated that a second mosaic, such as shown in Figure 4, and bridge arrangement may be provided with the second mosaic positioned so that its elements are at right angles to the elements of the first mosaic. If now a similar optical system for projecting an image on the mosaic is provided and the two mosaics mounted in close proximity, the directional path of the object may be completely plotted, since the second mosaic will given an indication as to whether or not the object is moving from the bottom up or from the top down, while the first mosaic provides the indication of motion from left to right or right to left. Moreover, a visual indication can be provided by using the arrangement shown in Figure 5.

Figure 5:
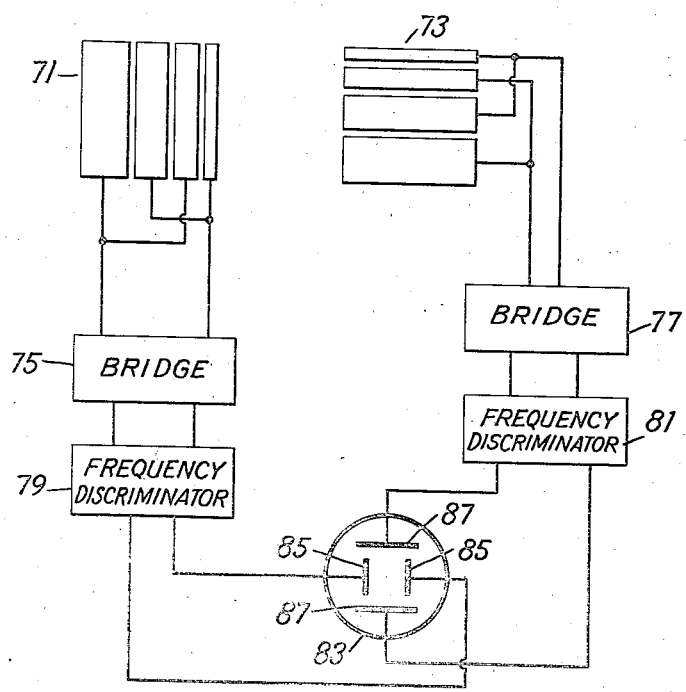
Figure 5 shows a further modification of Figure 2 using the mosaic shown in Figure 4.

In Figure 5, there is shown mosaics 71 and 73 with the elements thereof being mutually perpendicular. The alternate elements of mosaic 71 connected together feed the bridge 75, the output of which in turn is fed to a frequency discriminator 79 so as to give an output proportional to frequency. Similarly, the mosaic 73 feeds a bridge 77 whose output connected to the frequency discriminator 81 may give an output proportional to frequency. The output of the frequency discriminator 79 feeds the deflecting plates 85 of the cathode-ray oscilloscope 83, while the deflecting plates 87 of the oscilloscope 83 are fed from the frequency discriminator 81. It will be readily appreciated, therefore, that in accordance with the motion of the object, there will be traced on the luminescent screen of the oscilloscope a path which is representative of the path of the moving object, and, by making the screen of luminescent material having a long persistence, the observer has an opportunity to plot the course of the object moving within the field.

Various alterations and modifications of the present invention may become apparent to those skilled in the art and it is desirable that any and all such modifications and alterations be considered within the purview of the present invention except as limited by the hereinafter appended claims.

Having now described my invention, what I claim is:

1. A detecting system comprising a photoelectric device having a mosaic of two groups of alternately arranged photoelectric elements, all the elements of each group being connected together, a pair of serially connected resistors, connection from one group of elements to one of the resistors, connection from the other group of elements to the other resistor, means to form an image upon the mosaic, and means to derive from across the serially connected resistors a potential indicative of the difference between the illumination falling on one group of elements and the illumination falling on the second group of elements.

2. A detecting system comprising a photoelectric device having a mosaic of two groups of alternately arranged photoelectric elements, the elements of said mosaic having a progressively different area and all the elements of each group being connected together, a pair of serially connected resistors, connection from one group of elements to one of the resistors, connection from the other group of elements to the other resistor, means to project an image upon the mosaic, means to derive from across the serially connected resistors a potential indicative of the difference between the illumination falling on one group of elements and the illumination falling on the second group of elements, and means responsive to the derived potential to indicate the rate of change of differential illumination.

3. In a detecting system provided with a mosaic having two groups of alternately arranged photoelectric elements, all of the elements in each group being connected together, the method of deriving an indication of the presence of an object within a predetermined space which includes the steps of projecting an image of the space upon the mosaic, comparing the illumination falling on each of the groups of elements of the mosaic, deriving a potential representative of the difference in illumination falling on each group of elements, transmitting only the changes in the derived potential and providing an indication of the change in the derived potential to an observer.

4. A detecting system comprising a photoelectric device having a mosaic of two groups of alternately arranged photoelectric elements, the elements of said mosaic having a progressively different area and all the elements of each group being connected together, a pair of serially connected resistors, connection from one group of elements to one of the resistors, connection from the other group of elements to the other resistor, means to project an image upon the mosaic, means to derive from across the serially connected resistors a potential indicative of the difference between the illumination falling on one group of elements and the illumination falling on the second group of elements, means to derive energy representative of the rate of change in the derived potential, and means to operate an indicating device by the derived energy.

5. In a detecting system provided with a mosaic having two groups of alternately arranged light-responsive elements, all of the elements in each group being connected together, the method of deriving an indication of the presence of an object within a predetermined space which includes the steps of projecting an image of the space upon the mosaic, comparing the illumination falling on each of the groups of elements of the mosaic, which illumination is varied by the object, deriving a potential representative of the difference in illumination falling on each group of elements, deriving energy representative only of the changes in the derived potential and utilizing the derived energy to provide an indication to an observer of the change in the illumination.

6. A photoelectric device comprising a mosaic of photosensitized elements lying substantially in a common plane, the elements of said mosaic having a progressively decreasing dimension and belonging in one of two alternating groups and having all the elements of each group connected together and a light-permeable anode positioned in register with said mosaic and lying in a plane parallel to the plane of the mosaic.

7. In a detecting system provided with a mosaic having two groups of alternately arranged light responsive elements, all of the elements in each group being connected together, the method of deriving an indication of the presence of an object within a predetermined space which includes the steps of projecting an image of the space upon the mosaic, comparing the illumination falling on each of the groups of elements of the mosaic, deriving a potential representative of the difference in illumination, and producing a visual indication of the change in the derived potential to an observer.

8. In a detecting system provided with a mosaic having two groups of alternating elements, all of the elements in each group being connected together, the method of deriving an indication of the presence of an object within a predetermined space which includes the steps of projecting an image of the space on the mosaic, comparing the illumination falling on each of the groups of elements of the mosaic, deriving a potential representative of the difference in illumination, producing a visual indication of the change in the derived potential in one direction, projecting the image upon a second mosaic, deriving a potential representative of change of position of the image, and producing a visual indication by the derived potential in a direction at right angles to the first-named direction.

LOUIS MALTER.